(No Model.)
A. L. RIKER.
MEANS FOR MOUNTING AND DRIVING DYNAMO ELECTRIC MACHINES.
No. 525,118. Patented Aug. 28, 1894.
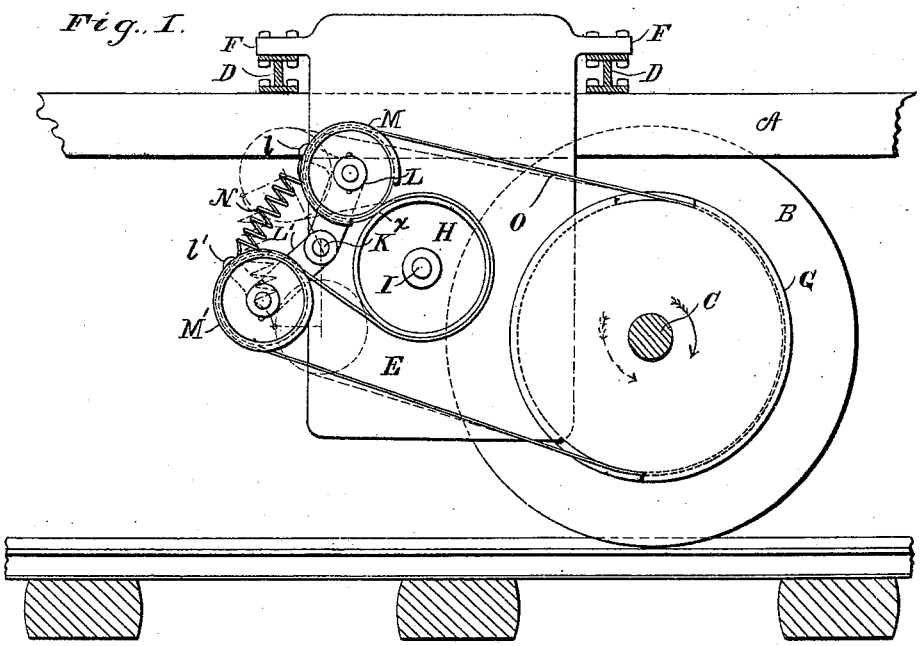
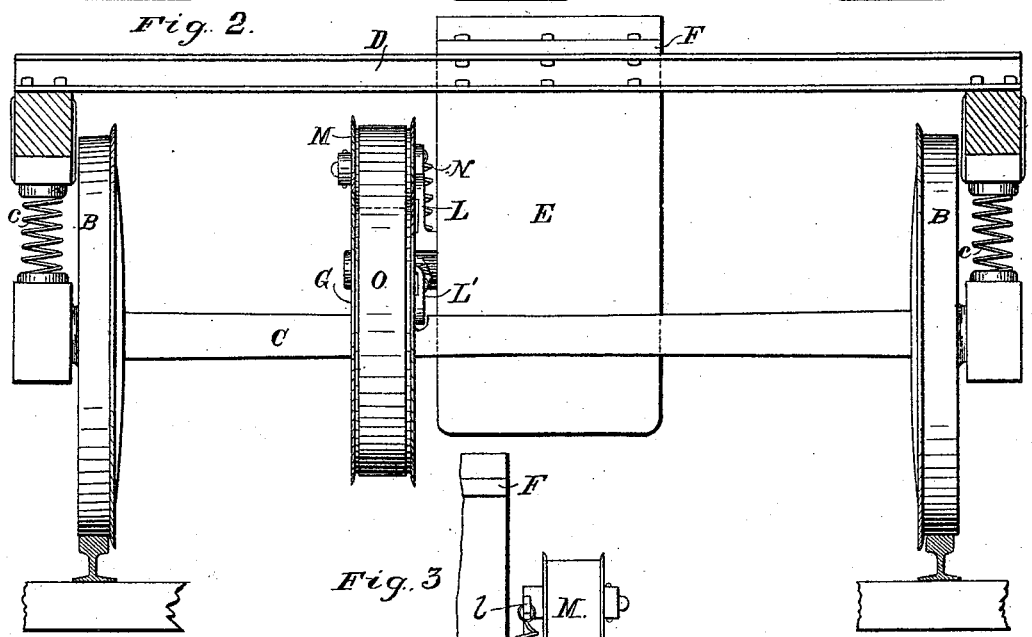
Witnesses.
W. R. Edelin.
Inventor.
Andrew L. Riker
by Pollok & Mauro
his attorneys.

UNITED STATES PATENT OFFICE.

ANDREW L. RIKER, OF NEW YORK, N. Y.

MEANS FOR MOUNTING AND DRIVING DYNAMO-ELECTRIC MACHINES.

SPECIFICATION forming part of Letters Patent No. 525,118, dated August 28, 1894.

Application filed May 19, 1894. Serial No. 511,868. (No model.)

*To all whom it may concern:*

Be it known that I, ANDREW L. RIKER, of New York city, New York, have invented a new and useful Improvement in Means for Mounting and Driving Dynamo-Electric Machines, which improvement is fully set forth in the following specification.

The present invention relates more particularly to means for mounting and driving dynamo electric machines used to generate current for train lighting. In such systems it is desirable to obtain the power for driving the dynamo from one of the axles, which has been successfully practiced in England and other countries, where the wheels are rigidly connected to the body of the car. In such case the dynamo can rest upon the car and be connected by a belt with a pulley on the car axle. In this country, where cars rest upon a truck pivoted to the car body the conditions are different, and this system of train lighting has not met with the same success as abroad, notwithstanding that it has been proposed to use devices in the nature of belt tighteners to take up slack in the belt due to the movements of the truck frame (on which the dynamo rests) relatively to the car axle. Furthermore, as the belt connecting the pulley on the car axle with that on the armature shaft is necessarily short, it is practically impossible, even by the use of belt tighteners, to prevent the belt from slipping to a certain extent. This is the more difficult to prevent owing to the power necessary to overcome the electrical resistance to the movement of the armature in the field of the dynamo.

According to my invention I provide a device which not only acts as a belt tightener to take up any slack, but which also serves to grip the belt against the driven pulley of the dynamo armature, thereby obviating the difficulties hereinbefore pointed out. This device is automatically reversible so that it acts with equal efficiency in whichever direction the car axle rotates.

What is deemed the most practical embodiment of the principle of my invention can be fully understood by reference to the accompanying drawings, in which—

Figure 1 is a longitudinal section through a car truck to which my improved means for mounting and driving a dynamo have been applied. Fig. 2 is an end view from the right of Fig. 1, and Fig. 3 is a detail of the idlers or loose pulleys and their connections.

Referring to the drawings A represents the truck-frame, B the wheels, C the car axle and $c$ $c$ springs for supporting the frame on the axle.

D, D are parallel cross-beams resting on the truck-frame B.

E is the dynamo casing provided with flanges F which rest upon the beams D, supporting the dynamo.

G is the driving pulley on the car axle C, located to one side of the dynamo casing and H is the driven pulley on the armature axle I arranged in line with pulley G.

K is a pivot pin on the casing E arranged at the side of the pulley opposite to the pulley G. Arms L L' are pivoted on this pin each being provided at its free end with an angular extension $l$, $l'$ and loose pulleys or idlers M M' respectively. The angular extensions $l$, $l'$ of the two arms are connected by a spring N which exerts its tension to pull the two pulleys M M' toward each other.

O is the belt which passes around the pulley G and from thence in open loops around the loose pulley M', pulley H of the armature axle and idler M in the order named.

The operation is as follows: Assuming the car axle to be rotating in the direction indicated by the arrow in Fig. 1 it will be understood that the pull of the belt will be along its upper side which will therefore be taut, throwing all the slack to the under side thereof. The effect of such pull on the upper side is to draw the loose pulley M over against the pulley H, gripping the belt O between said pulleys at the point $x$. This movement of the pulley M also moves the pulley M', to which it is connected by spring N, away from the pulley H, the tension of said spring operating to take up the slack in the under side of the belt. Upon a reversal in the direction of rotation of the car axle the rotation of the parts will be reversed (see dotted lines Fig. 1). The pull being then shifted to the under side of the belt, the loose pulley M' will be drawn over against the pulley H to grip the belt and the idler M will operate to take up the slack on the upper side of the belt. Any change in the distance between the pulleys G and I (caused by the movement of the truck-frame with reference to the axle, such movement being taken up by springs c, c) which would have a tendency to impair the operation of the apparatus by loosening or tightening the belt to too great an extent, is compensated for by a corresponding movement of the loose pulley which according to the direction of rotation of the car axle serves to take up the slack. By such an arrangement the belt is at all times maintained at a uniform tightness.

What I claim as new is—

1. The combination with a dynamo and a pulley carried by the armature axle thereof, of a driving pulley, a belt for transmitting motion from one to the other, and a swinging loose pulley or idler around which said belt is looped before passing around the armature pulley, so that the pull of the belt operates to draw said loose pulley or idler against the armature pulley gripping the belt against the same, substantially as described.

2. The combination with the armature pulley and driving pulley, of a belt for transmitting motion from one to the other, a swinging idler around which one side of said belt is looped, so that the pull of the latter operates to draw said idler against the armature pulley, gripping the belt against the same, and means for automatically taking up the slack in the other side of the belt, substantially as described.

3. The combination with the driven pulley and driving pulley adapted to rotate in either direction, of a belt for transmitting motion from one to the other, two swinging idlers around which the opposite sides respectively of said belt are looped before passing to the driven pulley, one of said idlers gripping the belt against the armature pulley while the other serves to take up the slack in the loose side thereof and connections whereby the functions of said idlers are reversed as the direction of rotation is reversed and the pull of the belt shifted from one side to the other, substantially as described.

4. The combination with the armature pulley and driving pulley adapted to rotate in either direction, of a belt for transmitting motion from one to the other, two pivotal swinging arms each carrying at its free end an idler around which the opposite sides of the belt are respectively passed, so that the idler which is looped in the side upon which the pull of the belt is thrown is drawn over against the armature pulley gripping the belt against the same, and a spring connecting the free ends of the arms, substantially as described.

5. In the improved means for mounting and driving dynamos for generating train lighting currents, the combination with the truck-frame and car axle, of a dynamo supported on said frame, a belt for transmitting motion from a driving pulley on the axle to a pulley on the armature axle, and two pivotal swinging arms each carrying at its free end an idler around which the opposite sides of the belt are respectively passed, so that the idler which is looped in the side upon which the pull of the belt is thrown is drawn over against the armature pulley gripping the belt against the same, and a spring connecting the free ends of the arms, substantially as described.

In testimony whereof I have signed this specification in the presence of two subscribing witnesses.

ANDREW L. RIKER.

Witnesses:
W. L. BLISS,
THOS. L. PROCTOR.